(12) United States Patent
Arioka

(10) Patent No.: US 11,754,424 B2
(45) Date of Patent: Sep. 12, 2023

(54) COMPUTER-READABLE NON-TRANSITORY MEDIUM, ESTIMATION DEVICE AND ESTIMATION METHOD

(71) Applicant: FUJITSU LIMITED, Kawasaki (JP)

(72) Inventor: Takahiro Arioka, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/847,954

(22) Filed: Jun. 23, 2022

(65) Prior Publication Data

US 2023/0098933 A1 Mar. 30, 2023

(30) Foreign Application Priority Data

Sep. 30, 2021 (JP) .................. 2021-160265

(51) Int. Cl.
*G01D 5/353* (2006.01)
*G02B 6/44* (2006.01)

(52) U.S. Cl.
CPC ....... *G01D 5/35361* (2013.01); *G02B 6/4422* (2013.01)

(58) Field of Classification Search
CPC ................ G02B 6/4422; G01D 5/35361
See application file for complete search history.

(56) References Cited

U.S. PATENT DOCUMENTS

| | | | | |
|---|---|---|---|---|
| 11,422,146 B2 * | 8/2022 | Huang | ................ | G01P 5/26 |
| 2022/0044552 A1 | 2/2022 | Yoda et al. | | |

FOREIGN PATENT DOCUMENTS

| | | | | | |
|---|---|---|---|---|---|
| CN | 107861134 A | * | 3/2018 | ............ | G01S 19/14 |
| CN | 207280630 U | * | 4/2018 | ............ | G01K 11/32 |
| CN | 207866359 U | | 9/2018 | | |
| CN | 113049909 A | | 6/2021 | | |
| CN | 113092082 A | | 7/2021 | | |
| CN | 113253362 A | * | 8/2021 | ............ | G01W 1/06 |
| JP | 6-213911 A | | 8/1994 | | |
| JP | 7-140161 A | | 6/1995 | | |

(Continued)

OTHER PUBLICATIONS

M. Jafari et al.; "Wind-induced vibration of structural cables"; 2020, http://doi.org/10.1007/s11071-020-05541-6; Mar. 17, 2020; (87 pages).

(Continued)

*Primary Examiner* — Daniel Petrovsek
(74) *Attorney, Agent, or Firm* — STAAS & HALSEY LLP

(57) ABSTRACT

A computer-readable, non-transitory medium storing a program that causes a computer to execute a process is provided. The process includes acquiring a backward Rayleigh scattered light from an optical fiber composite overhead ground wire provided along an electrical power transmission line, determining each of spectral densities of each of frequencies of vibration of the optical fiber composite overhead ground wire, on a basis of the backward Rayleigh scattered light, estimating a wind speed of a wind hitting the electrical power transmission line, on a basis of a first spectral density of a first frequency band including a natural frequency of the optical fiber composite overhead ground wire, and estimating a wind direction of the wind, on a basis of a second spectral density of a second frequency band which does not include the natural frequency of the optical fiber composite overhead ground wire.

15 Claims, 14 Drawing Sheets

(56) References Cited

FOREIGN PATENT DOCUMENTS

| JP | 2002-032366 A | 1/2002 |
| JP | 2003-185762 A | 7/2003 |
| JP | 2008-191077 A | 8/2008 |
| JP | 2009-162657 A | 7/2009 |
| JP | 2020-193858 A | 12/2020 |
| WO | WO 2020/116032 A1 | 6/2020 |

OTHER PUBLICATIONS

E. Fernandez et al.; "Review of dynamic line rating systems for wind power integration"; 2016; www.sciencedirect.com/science/article/pii/S1364032115007960; vol. 52, Jan. 2016; pp. 80-92; (3 pages).

Extended European Search Report dated Nov. 24, 2022 in related European Patent Application No. 22180699.5 (5 pages).

\* cited by examiner

FIG. 14

| | | POSITION IN OPTICAL FIBER | | | | | |
|---|---|---|---|---|---|---|---|
| | | 0m | 1.25m | 2.5m | 3.75m | 5m | 6.75m |
| | 0:00:00.000 | 3.211 | 3.410 | 3.410 | 1.476 | 0.996 | 0.996 |
| | 0:00:00.002 | 1.435 | 0.325 | -3.106 | -1.629 | -3.935 | -3.515 |
| | 0:00:00.004 | -1.583 | -2.499 | -9.578 | -2.869 | -8.159 | -5.078 |
| ELAPSED TIME | 0:00:00.006 | -3.022 | -5.048 | -16.426 | -5.232 | -8.810 | -4.188 |
| | 0:00:00.008 | -3.170 | -10.389 | -10.976 | -6.918 | -8.493 | -2.015 |
| | 0:00:00.010 | -1.631 | -10.342 | -8.771 | -6.313 | -7.183 | -3.005 |
| | 0:00:00.012 | -2.211 | -7.224 | -5.672 | -3.722 | -3.722 | -2.760 |
| | 0:00:00.014 | -2.219 | -2.207 | -1.595 | -1.492 | -2.523 | -2.547 |
| | 0:00:00.016 | 0.293 | 0.813 | 1.298 | 0.880 | -1.962 | -2.547 |

COMPUTER-READABLE NON-TRANSITORY MEDIUM, ESTIMATION DEVICE AND ESTIMATION METHOD

CROSS-REFERENCE TO RELATED APPLICATION

This application is based upon and claims the benefit of priority of the prior Japanese Patent Application No. 2021-160265, filed on Sep. 30, 2021, the entire contents of which are incorporated herein by reference.

FIELD

A certain aspect of embodiments described herein relates to a computer-readable non-transitory medium, an estimation device and an estimation method.

BACKGROUND

A method called dynamic line rating has been proposed in which an amount of electrical power of a transmission line is controlled while monitoring a temperature of the transmission line. By adopting the dynamic line rating, the amount of power transmission is controlled in real time, so energy saving can be realized. The temperature of the transmission line depends on a wind speed and a direction of the wind to which the transmission line is exposed. Therefore, in order to realize the dynamic line rating, it is desirable to monitor the wind speed and the wind direction in real time. In order to monitor the wind direction and the wind speed, for example, a sensor may be provided on the transmission line and measured data of the sensor may be transmitted by a wire. However, the transmission of the measured data may be hindered by a high magnetic field or a high electric field generated in the vicinity of the transmission line. In addition, since the transmission line itself is laid over a distance of several kilometers, it is necessary to install a large number of sensors on the transmission line, which causes problems in sensor maintainability and cost.

SUMMARY

According to an aspect of the present invention, there is provided a computer-readable, non-transitory medium storing a program that causes a computer to execute a process, the process including: acquiring a backward Rayleigh scattered light from an optical fiber composite overhead ground wire that is provided along an electrical power transmission line; determining each of spectral densities of each of a plurality of frequencies of vibration of the optical fiber composite overhead ground wire, on a basis of the backward Rayleigh scattered light; estimating a wind speed of a wind hitting the electrical power transmission line, on a basis of a first spectral density of a first frequency band including a natural frequency of the optical fiber composite overhead ground wire among the spectral densities; and estimating a wind direction of the wind, on a basis of a second spectral density of a second frequency band which does not include the natural frequency of the optical fiber composite overhead ground wire among the spectral densities.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 14 is a schematic diagram illustrating an example of strain rate data.

DESCRIPTION OF EMBODIMENTS

Before describing an embodiment, a description will be given of matters which the present inventor studied.

Figure 1:
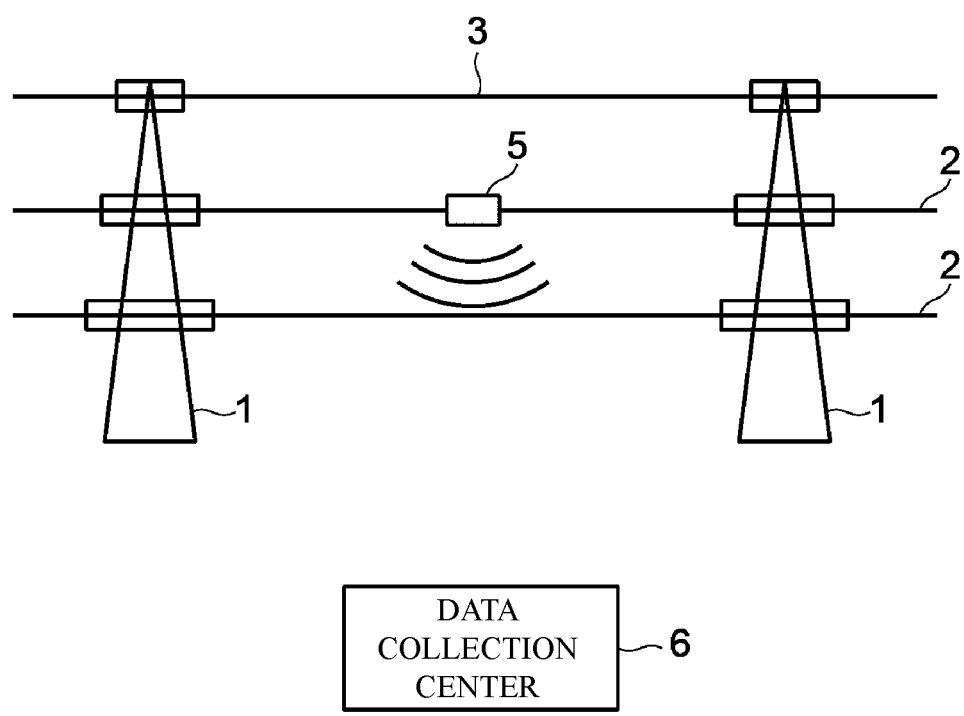
FIG. 1 schematically illustrates an electrical power transmission line and surroundings thereof.

FIG. 1 is a schematic diagram of an electrical power transmission line and surroundings thereof. In this example, a transmission line 2 is provided between steel towers 1, and an OPGW (Optical fiber composite overhead ground wire) 3 is provided so as to be parallel to the transmission line 2.

The transmission line 2 is provided with a sensor 5 for measuring a wind speed and a wind direction. The sensor 5 wirelessly transmits the measured data including the measured wind speed and the measured wind direction to a data collection center 6 and the like. In addition to the wind speed and the wind direction, the sensor 5 may measure a temperature of an electric line, vibration of the electric line, and the like.

Based on the wind speed and the wind direction measured by the sensor 5 in this way, the data collection center 6 can estimate the temperature of the transmission line 2.

However, the sensor 5 installed in the transmission line 2 needs to be resistant to a high electric field and a high magnetic field. Further, since it is difficult to supply electrical power to the sensor 5 from the outside, a power generation mechanism for supplying electrical power to the sensor 5 is also required. Therefore, the types of the sensors 5 that can be installed on the transmission line 2 in this way are limited. Moreover, since the transmission line 2 is laid over a distance of several km, it is necessary to provide a large number of sensors on the transmission line, which causes problems in the maintainability and cost of the sensors.

Figure 2:
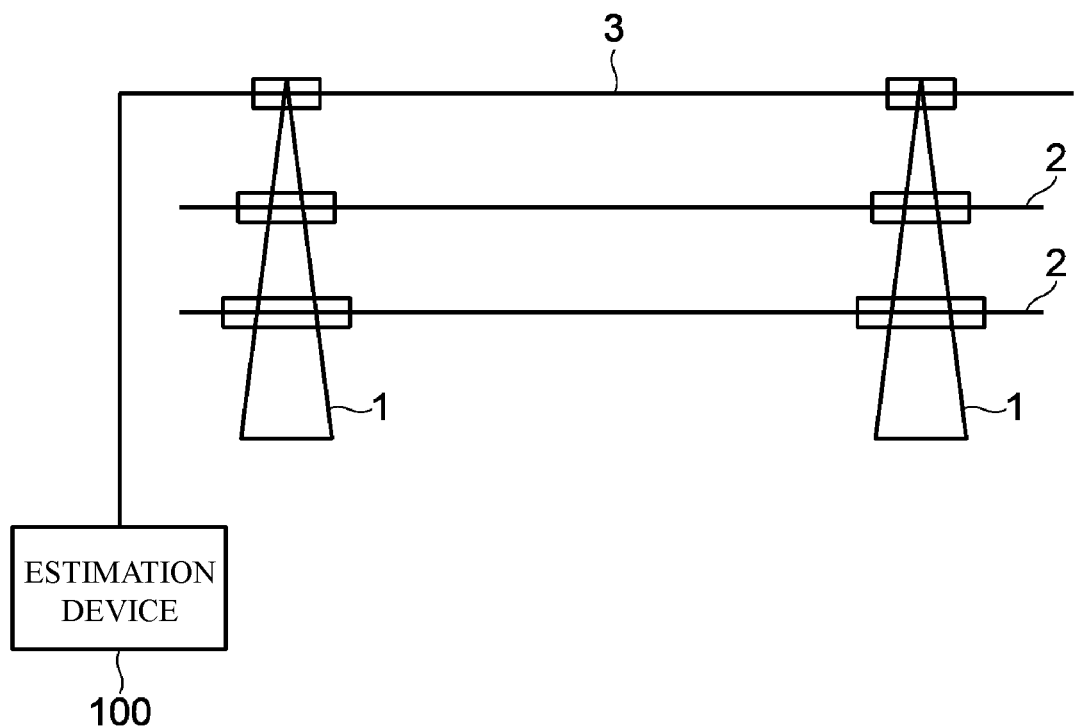
FIG. 2 schematically illustrates a system in accordance with an embodiment.

(Embodiment) FIG. 2 schematically illustrates a system in accordance with an embodiment. In FIG. 2, the same elements as those of FIG. 1 have the same numerals as those of FIG. 1. And, an explanation of the elements is omitted.

The system is used for estimating a wind speed and a wind direction of a window hitting the transmission line 2 and has an estimation device 100.

The embodiment uses an optical fiber vibration measurement system (DAS: Distributed Acoustic Sensing) as the estimation device 100. DAS is a system that calculates the vibration due to expansion and contraction of the optical fiber, based on the time from when a pulsed light is incident on the optical fiber of the OPGW 3 until the rear Rayleigh scattered light returns, the phase difference of the rear Rayleigh scattered light, and the intensity of the rear Rayleigh scattered light.

Figure 3A:
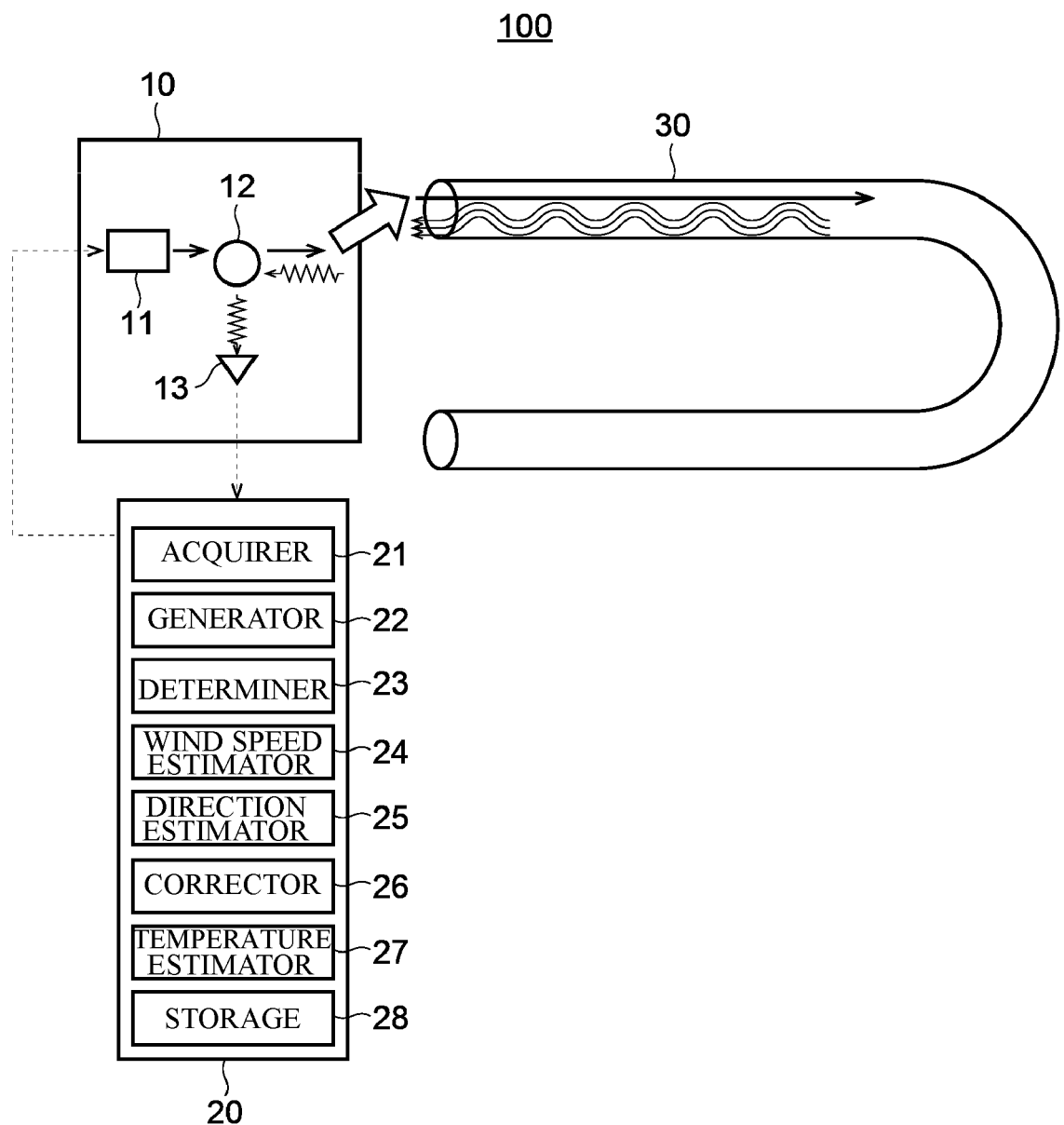
FIG. 3A illustrates an overall configuration of an estimation device.

FIG. 3A is a schematic diagram illustrating the overall configuration of the estimation device 100. As illustrated in FIG. 3A, the estimation device 100 includes a measure 10, a calculator 20, and the like. The measure 10 includes a laser 11, an optical circulator 12, a detector 13, and the like. The calculator 20 includes an acquirer 21, a generator 22, a determiner 23, a wind speed estimator 24, a wind direction estimator 25, a corrector 26, a temperature estimator 27, and a storage 28.

Figure 3B:
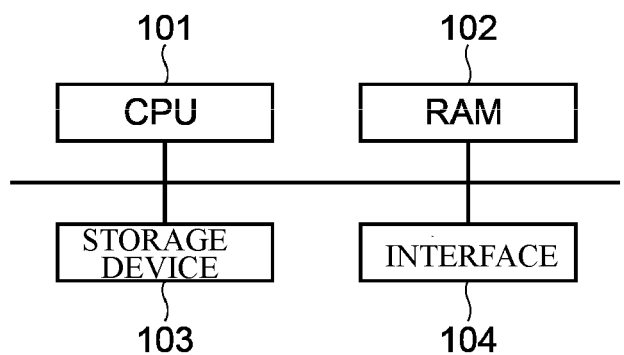
FIG. 3B is a block diagram for explaining a hardware configuration of a calculator.

FIG. 3B is a block diagram for explaining a hardware configuration of the calculator 20. As illustrated in FIG. 3B, the calculator 20 includes a CPU (Central Processing Unit) 101, a RAM (Random Access Memory) 102, a storage device 103, an interface 104, and the like. Each of these devices is connected by a bus or the like. The CPU 101 includes one or more cores. The RAM 102 is a volatile memory that temporarily stores a program executed by the CPU U101, data processed by the CPU 101, and the like. The storage device 103 is a non-volatile storage device. As the storage device 103, for example, a ROM (Read Only Memory), a solid state drive (SSD) such as a flash memory, a hard disk driven by a hard disk drive, or the like can be used. By executing the estimation program stored in the storage device 103, the CPU 101 causes the calculator 20, the acquirer 21, the generator 22, the determiner 23, the wind speed estimator 24, the wind direction estimator 25, the corrector 26, the temperature estimator 27 and the storage 28 are realized. Each part of the calculator 20 may be a hardware such as a dedicated circuit.

The laser 11 is a light source such as a semiconductor laser, and emits a laser light in a predetermined wavelength range to an optical fiber 30 of the OPGW 3. In the embodiment, the laser 11 emits an optical pulse (laser pulse) at predetermined time intervals. The optical circulator 12 guides the optical pulse emitted by the laser 11 to the optical fiber 30 to be measured for vibration, and guides the backward scattered light returned from the optical fiber 30 to the detector 13.

The optical pulse incident on the optical fiber 30 propagates in the optical fiber 30. The optical pulse gradually attenuates while generating forward scattered light traveling in the propagation direction and backscattered light (return light) traveling in the feedback direction, and propagates in the optical fiber 30. The backscattered light re-enters the optical circulator 12. The backscattered light incident on the optical circulator 12 is emitted to the detector 13. The detector 13 is, for example, a receiver for obtaining a phase difference from the local oscillation light.

Figure 4:
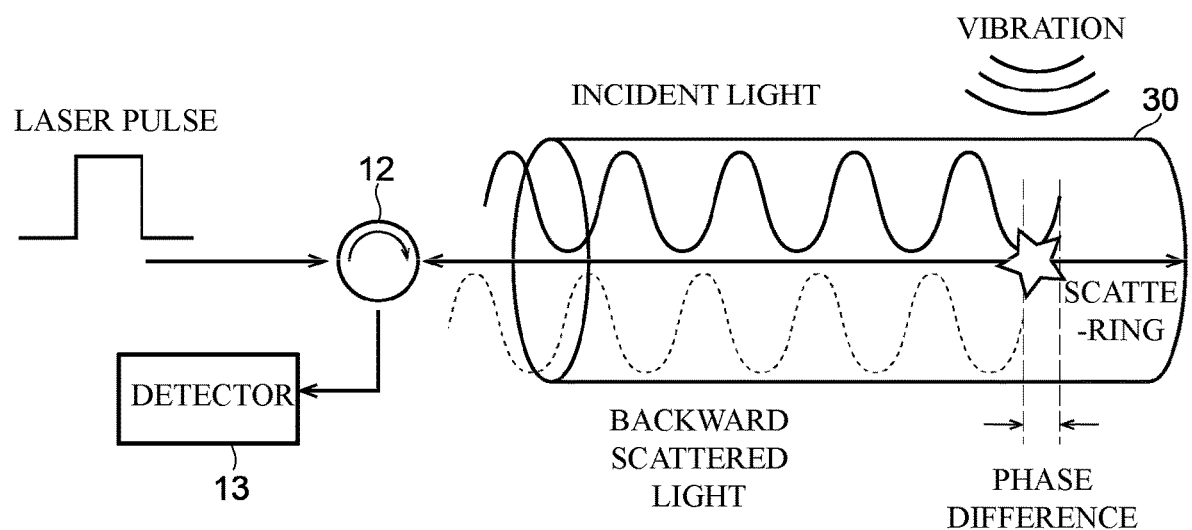
FIG. 4 is a diagram for explaining a principle of vibration measurement.

FIG. 4 is a diagram for explaining the principle of the vibration measurement. As illustrated in FIG. 4, a laser pulse is incident on the optical fiber 30 as incident light. The backward scattered light includes a coherent light of the return light, which is Rayleigh scattered light having the same frequency as the incident light.

A phase of the coherent light is shifted due to vibration and the coherent light returns to the optical circulator 12. The acquirer 21 acquires the coherent light of this return light. The generator 22 generates time-series data (hereinafter, referred to as time-series phase data) of the phase difference caused by the expansion and contraction of the optical fiber 30 at each sampling position based on the detection result of the detector 13. The phase difference caused by the expansion and contraction of the optical fiber 30 is, for example, a phase difference caused by a change in time, a phase difference caused by a change in location, a phase difference between incident light and backscattered light, and the like.

The storage 28 stores the time-series phase data at each sampling position which is made by the acquirer 21. The sampling position is a point defined at a predetermined interval or a section defined at a predetermined interval in the stretching direction of the optical fiber 30. For example, the sampling position is a point defined every 1.25 m or a section defined every 1.25 m and having a length of 1.25 m or less in the stretching direction of the optical fiber 30. Each phase difference of the time series phase data may be obtained from the phase difference detected at each point, or may be obtained from a total or an average of the phase differences detected in each section. If the next laser pulse is oscillated before the return light scattered at the end of the optical fiber 30 returns, the return light will be mixed and correct measurement will not be possible. Therefore, the minimum period of the laser pulse is determined by the length of the optical fiber to be measured.

The vibration measurement can be performed using the time-series phase data at each sampling position. For example, from the time-series phase data, it is possible to calculate vibration data indicating how much each sampling position of the optical fiber 30 is displaced per unit time. This method is known as self-interferometry. The physical quantity to be measured differs depending on whether the light to be interfered is local oscillation light or backscattered light. The former is the phase difference corresponding to the strain, and the latter is the phase difference with respect to the strain rate by taking a time difference. By acquiring the phase difference with the laser pulse period, the phase difference can be converted into time-series strain vibration data corresponding to the optical fiber position. Based on such time-series strain vibration data, the determiner 23 determines each spectral density of a plurality of frequencies pf the vibration of the OPGW 3.

Figure 5:
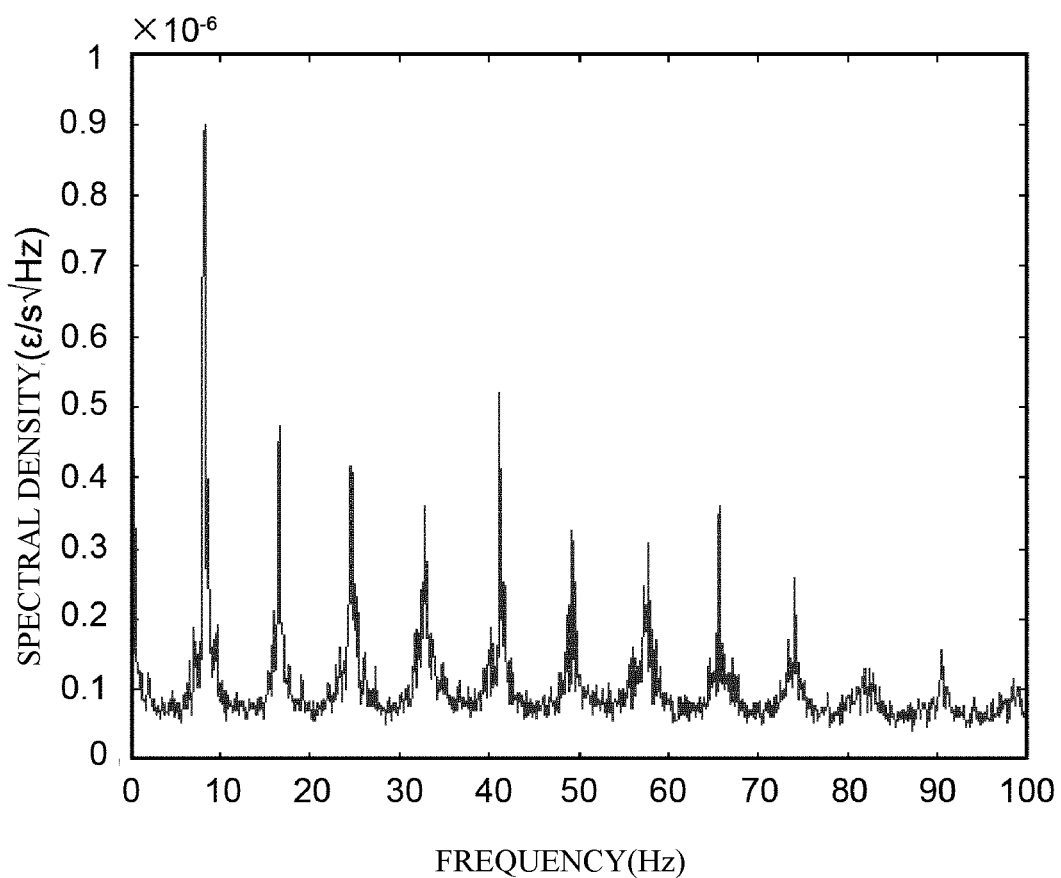
FIG. 5 is a schematic diagram of a spectral density determined by a determiner.

FIG. 5 is a schematic diagram of the spectral density determined by the determiner 23. The horizontal axis of FIG. 5 indicates the vibration frequency of the OPGW 3, and the vertical axis indicates the spectral density. As illustrated in FIG. 5, there are a plurality of peaks in the spectral density. These peaks correspond to the natural frequency of the OPGW 3.

The natural frequency of the OPGW 3 changes depending on the tension of the OPGW 3. Therefore, when the bolt of a steel tower 1 is loosened, the tension of the OPGW 3 changes, and the natural frequency of the OPGW 3 also changes. Further, even if a component called a cleat connecting the OPGW 3 and the steel tower 1 or a clamp connecting the transmission line 2 and the steel tower 1 is loosened, the tension of the OPGW 3 changes and the natural frequency of the OPGW 3 also changes.

Figure 6:
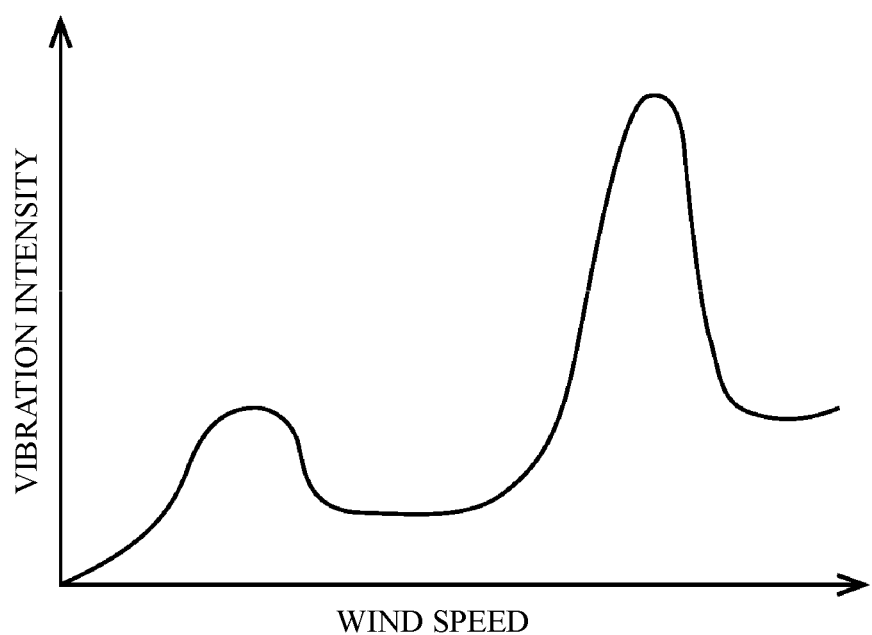
FIG. 6 is a schematic diagram illustrating a relationship between a wind speed of a wind hitting an OPGW and vibration intensity of the OPGW.

FIG. 6 is a schematic diagram illustrating a relationship between the wind speed of the wind hitting the OPGW 3 and the vibration intensity of the OPGW 3.

As illustrated in FIG. 6, the wind speed and the vibration intensity have a non-linear relationship. This is because the vortex in the vicinity of the OPGW 3 changes depending on the wind speed. In addition, normally, when the OPGW 3 is vibrated, a lock-in phenomenon in which resonance occurs near the natural frequency of the OPGW 3 occurs. But such a non-linear relationship can be obtained even when the wind speed becomes stronger and the lock-in phenomenon disappears.

Figure 7A:
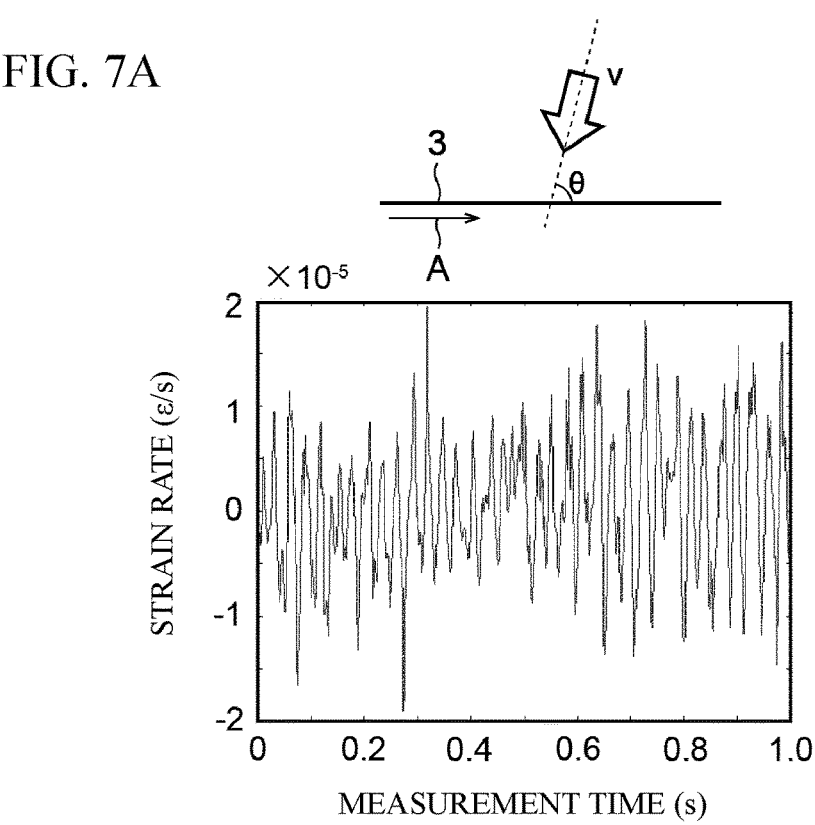
FIG. 7A and FIG. 7B are diagrams illustrating a relationship between a strain rate of an OPGW and a wind direction.
Figure 7B:
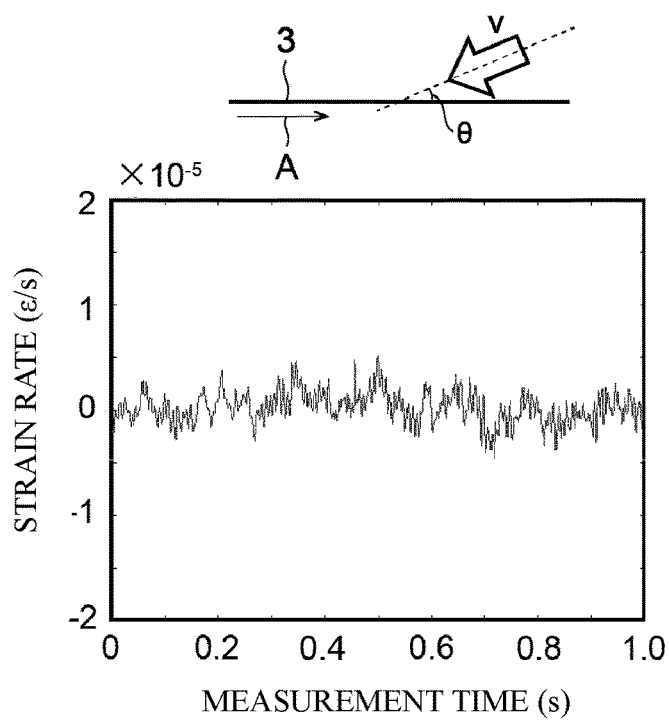

FIG. 7A and FIG. 7B are diagrams illustrating a relationship between a strain rate of the OPGW 3 and the wind direction. Here, the angle $\theta$ ($0 \le \theta \le 90°$) between the extending direction A of the OPGW 3 and the direction in which the wind flows is defined as the wind direction. Further, in both of FIG. 7A and FIG. 7B, the magnitude of the wind speed "v" is the same as each other.

As illustrated in FIG. 7A and FIG. 7B, the strain rate largely depends on the wind direction $\theta$. In particular, when the wind direction $\theta$ is 90°, the OPGW 3 vibrates most strongly, and conversely, when the wind direction $\theta$ is 0°, the vibration of the OPGW 3 becomes the weakest.

In FIG. 7A and FIG. 7B, the magnitude of the wind speed "v" is constant and the wind direction "$\theta$" is changed. On the contrary, when the wind direction $\theta$ is constant and the wind speed "v" is changed, the vibration intensity of the OPGW 3 becomes stronger near the natural frequency. This is because the wind speed "v" and the vibration intensity near the natural frequency have a strong correlation.

Using this, in the present embodiment, the estimation device 100 estimates the wind speed and the wind direction as follows.

Figure 8:
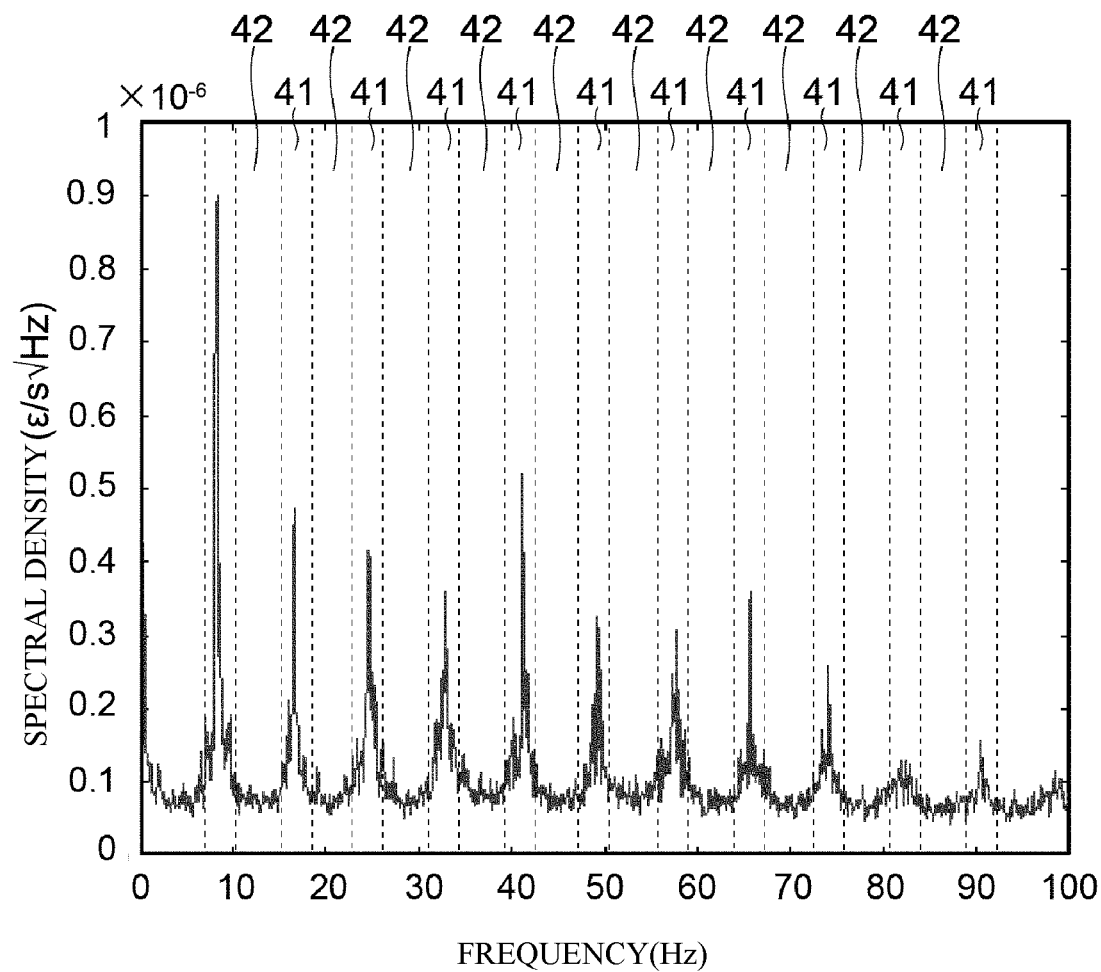
FIG. 8 is a schematic diagram of a spectral density of vibration at a certain position of an OPGW used to estimate a wind speed and a wind direction.

FIG. 8 is a schematic diagram of the spectral density of the vibration at a certain position of the OPGW 3 used to estimate the wind speed and the wind direction.

As illustrated in FIG. 8, the determiner 23 divides this spectral density into a first frequency band 41 including the natural frequency of the OPGW 3 and a second frequency band 42 not including the natural frequency of the OPGW 3.

As described above, the wind speed has a strong correlation with the vibration intensity near the natural frequency of the OPGW 3. Therefore, the wind speed estimator 24 estimates the wind speed of the wind that hits the transmission line 2 parallel to the OPGW 3 based on the spectral density in the first frequency band 41 including the natural frequency.

As an example, the wind speed estimator 24 estimates the wind speed "v" at the position where the spectral density of FIG. 8 is acquired, based on the following equation (1).

$$v = f(X, \theta) \quad (1)$$

Note that "f" is a function that has been determined in advance by experiments. Further, "X" is the first spectral density in the first frequency band 41. Then, "$\theta$" is the wind direction defined in FIG. 7A and FIG. 7B. The wind speed estimator 24 estimates the wind speed of the wind hitting the transmission line 2 near each position from the equation (1) by using the first spectral density "X" at each position of the OPGW 3.

Figure 9:
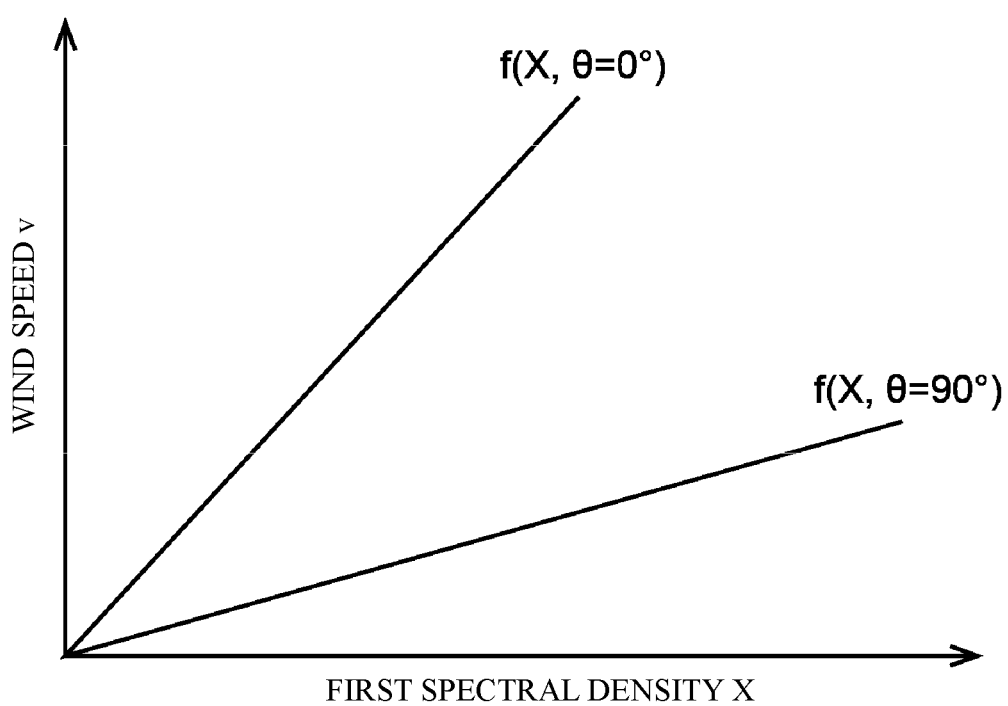
FIG. 9 is a schematic diagram illustrating an example of a functional form of a function "f"

FIG. 9 is a schematic diagram illustrating an example of the functional form of the function "f". In this example, a function "f" is adopted in which the wind speed "v" linearly increases with respect to the first spectral density X when the wind direction $\theta$ is fixed. Further, when the results of FIG. 7A and FIG. 7B are reflected and the wind speed "v" is fixed, the larger the wind direction "$\theta$" is, the larger the first spectral density "X" is.

On the other hand, since the wind direction "$\theta$" affects the strain rate as illustrated in FIG. 7A and FIG. 7B, the wind direction "$\theta$" has a correlation with the second spectral density "Y" of the second frequency band 42 that does not include the natural frequency. Therefore, the wind direction estimator 25 estimates the wind direction $\theta$ ($0 \le \theta \le 90°$) based on the following equation (2).

$$\theta = g(Y) \quad (2)$$

Note that "g" is a function that has been determined in advance by experiments. The wind direction estimator 25 estimates the wind direction of the wind hitting the transmission line 2 near each position from the equation (2) by using the second spectral density "Y" at each position of the OPGW 3.

By the way, in the definition of the wind direction "$\theta$" according to FIG. 7A and FIG. 7B, the strain rate is the same in all of the wind direction "$\theta$", the wind direction "$-\theta$", the wind direction "$90°-\theta$", and the wind direction "$-90°+\theta$". Therefore, even if the wind direction "$\theta$" is obtained by the equation (2), it is not clear which of "$\theta$", "$-\theta$", "$90°-\theta$", and "$-90°+\theta$" the actual wind direction corresponds to.

Therefore, in the present embodiment, for example, the wind direction "$\theta$" is corrected as follows by using the wind direction data provided by AMeDAS (Automated Meteorological Data Acquisition System).

Figure 10:
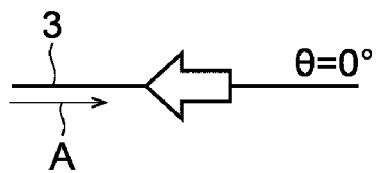
FIG. 10 is a schematic diagram illustrating a method for correcting a wind direction.
Figure 10:
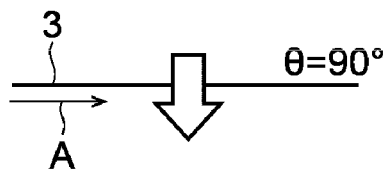
Figure 10:
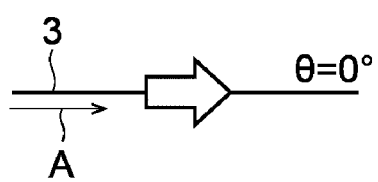
Figure 10:
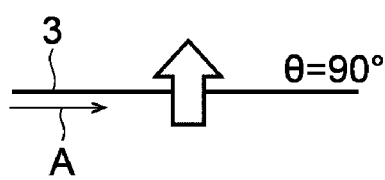
Figure 10:
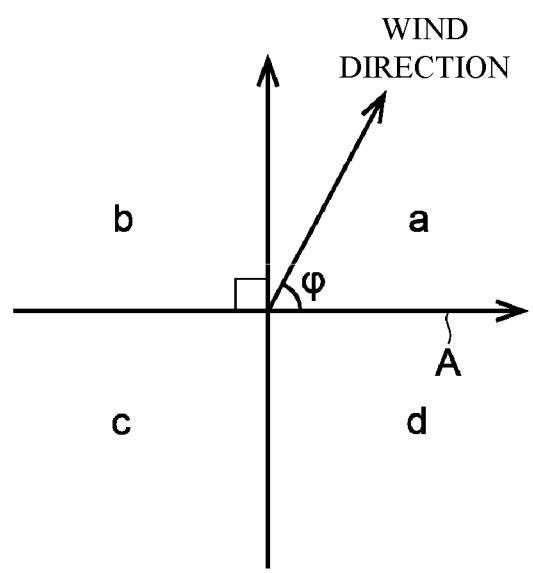

FIG. 10 is a schematic diagram illustrating a method for correcting the wind direction "$\theta$". Here, the acquirer 21 acquires the angle "$\phi$" ($0 \le \phi < 360°$) between the extension direction A and the wind direction. As an example, the acquirer 21 acquires the information of AMeDAS including the wind direction, and acquires the angle $\phi$ from the information. The OPGW 3 may be provided with a wind direction sensor, and the acquirer 21 may acquire the wind direction measured by the wind direction sensor as an angle "$\phi$".

Next, the corrector 26 corrects the wind direction "$\theta$" as follows.

a when $0° \le \phi \le 90°$
$\theta \rightarrow \theta$
b when $90° < \phi \le 180°$
$\theta \rightarrow 0\ 180° - \theta$
c when $180° < \phi \le 270°$
$\theta \rightarrow 180° + \theta$
d when $270° < \phi \le 360°$
$\theta \rightarrow 360° - \theta$ As a result, the wind direction "$\theta$", which is in the range of $0 \le \theta \le 90°$ before the correction, can be expanded to the range of $0 \le \theta < 360°$.

By the way, as explained with reference to FIG. 6, the wind speed and the vibration intensity of the OPGW 3 have a non-linear relationship. The method of correcting the wind direction "$\theta$" due to this non-linearity will be described below.

Figure 11:
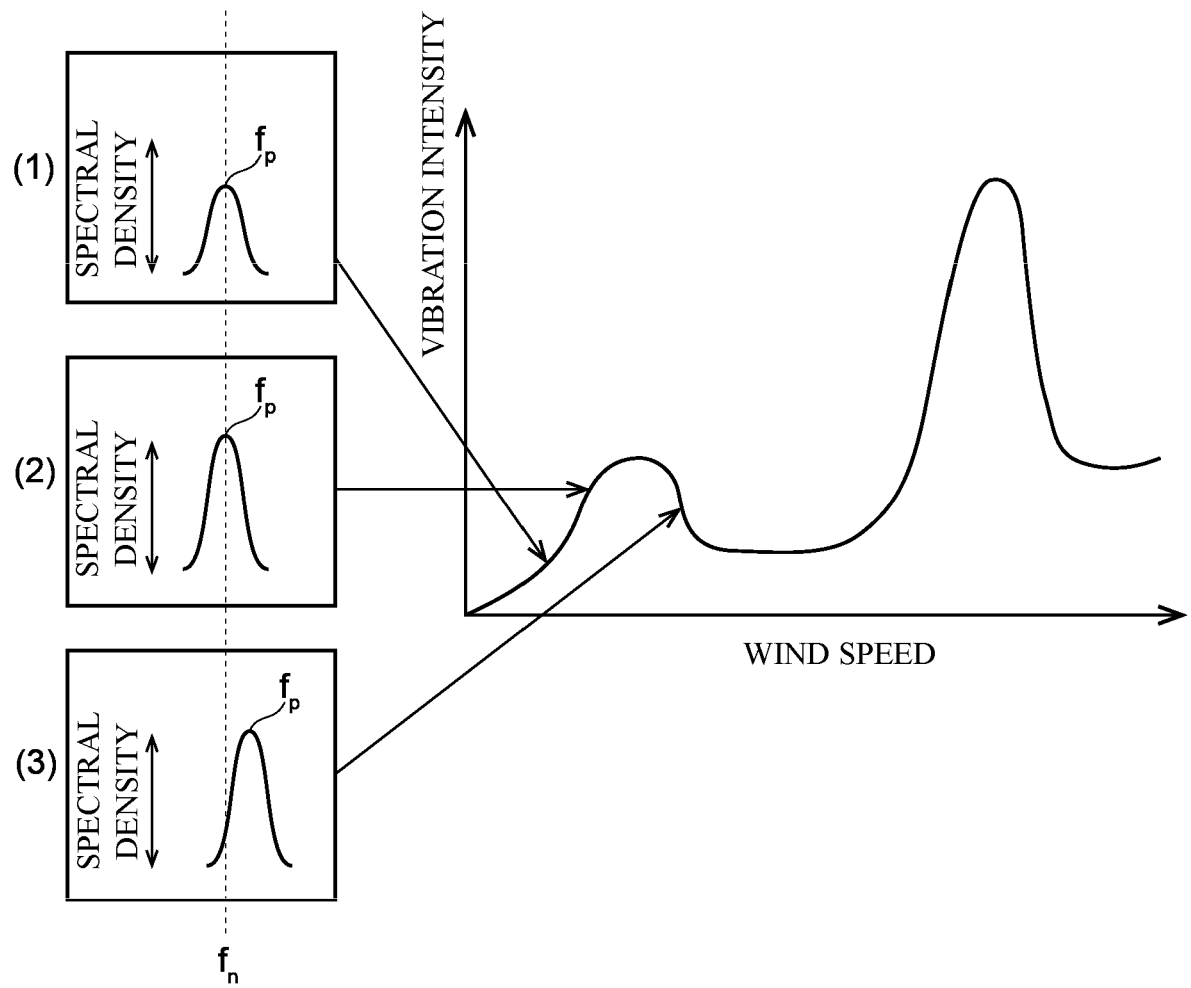
FIG. 11 is a schematic diagram illustrating a correction method of a wind direction.

FIG. 11 is a schematic diagram illustrating the correction method. As the wind speed increases, the vibration intensity of the OPGW3 usually increases. Therefore, as indicated by (1) and (2) of FIG. 11, the vibration intensity near the natural frequency "$f_n$" also increases due to the lock-in phenomenon, and the peak frequency "$f_p$" of the vibration matches the natural frequency "$f_n$".

However, when the wind speed increases to some extent, the lock-in phenomenon does not occur, so that the peak frequency "$f_p$" of the vibration becomes larger than the natural frequency "$f_n$" as indicated by (3) of FIG. 11, and the spectral density at the natural frequency "$f_n$" decreases.

Therefore, when the vibration intensity decreases with the increase of the wind speed in this way, the corrector 26 makes a correction for the first spectral density "X" to compensate for the decrease in the vibration intensity. As an example, the corrector 26 corrects the first spectral density "X" as in the following equation (3).

$$X \to C\ (f_p) * X \qquad (3)$$

$C\ (f_p)$ is a predetermined correction function. The form of the function $C\ (f_p)$ may be optimized by experiments or the like. As an example, a function that increases as the difference between the peak frequency "$f_p$" and the natural frequency "$f_n$" increases may be adopted as the function $C\ (f_p)$. Furthermore, "*" is an operator indicating convolution. Further, in this case, the wind speed estimator 24 estimates the wind speed "v" according to the following equation (4).

$$v = f\ (C\ (f_p) * X,\ \theta) \qquad (4)$$

By the way, although the wind speed and the wind direction of the wind hitting the transmission line 2 can be estimated as described above, it is preferable to estimate the temperature of the transmission line 2 in order to realize the dynamic line rating.

Figure 12:
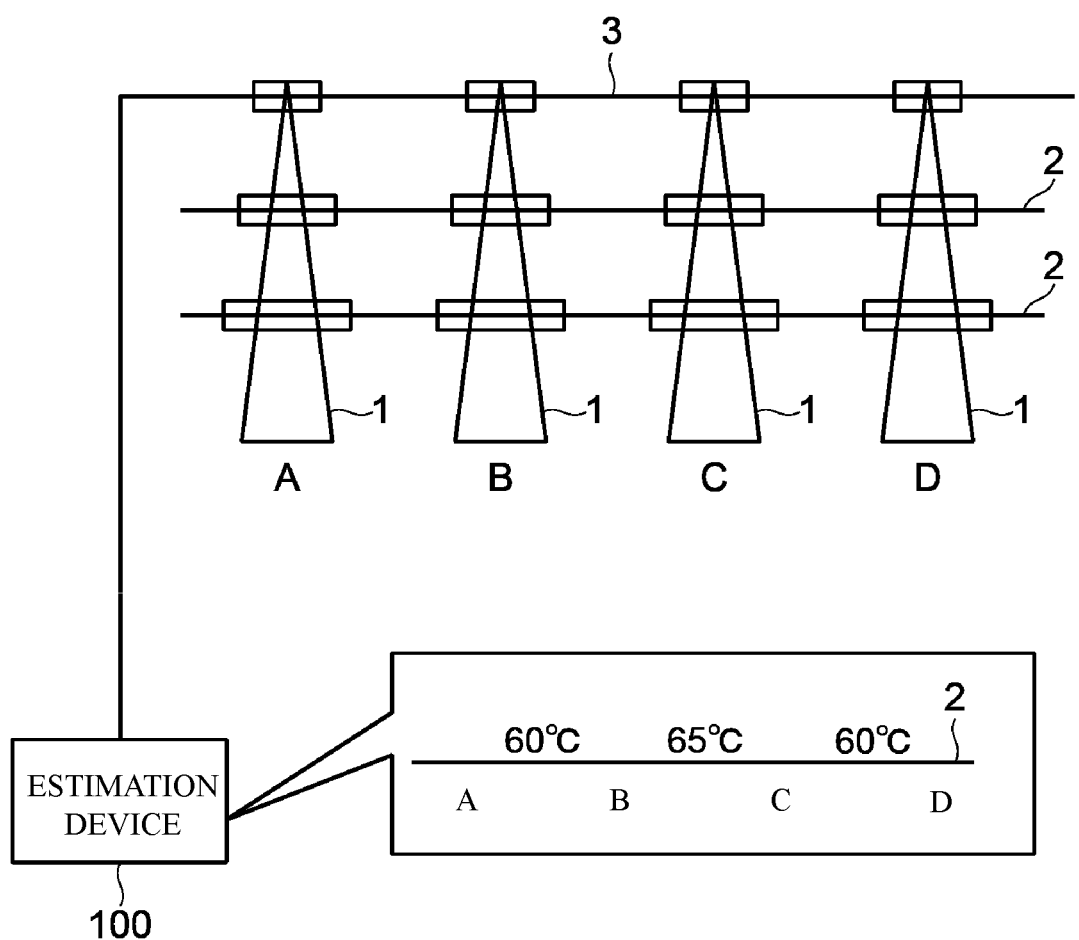
FIG. 12 is a schematic diagram illustrating a method of estimating a temperature of a transmission line.

FIG. 12 is a schematic diagram illustrating a method of estimating the temperature of a transmission line. In this example, the temperature estimator 27 estimates the temperature of the transmission line 2 based on the wind speed and the wind direction estimated as described above. The estimation method is not particularly limited. For example, a model for obtaining the temperature of the transmission line 2 from the air temperature, the amount of sunshine, the wind direction, and the wind speed may be created, and the temperature estimator 27 may obtain the temperature of the transmission line 2 based on the model. Regarding the air temperature and the amount of sunshine in this case, a sensor for measuring the air temperature and the amount of sunshine may be provided in the transmission line 2 and the output value of the sensor may be used, or the temperature and the amount of sunshine included in the information of AMeDAS in the vicinity of the transmission line 2 may be used. Further, since the estimation device 100 using DAS can estimate the wind direction and the wind speed for each position of the transmission line 2, the temperature estimator 27 may estimate the temperature distribution along the extension direction of the transmission line 2 by estimating the temperature for each position of the transmission line 2.

Figure 13:
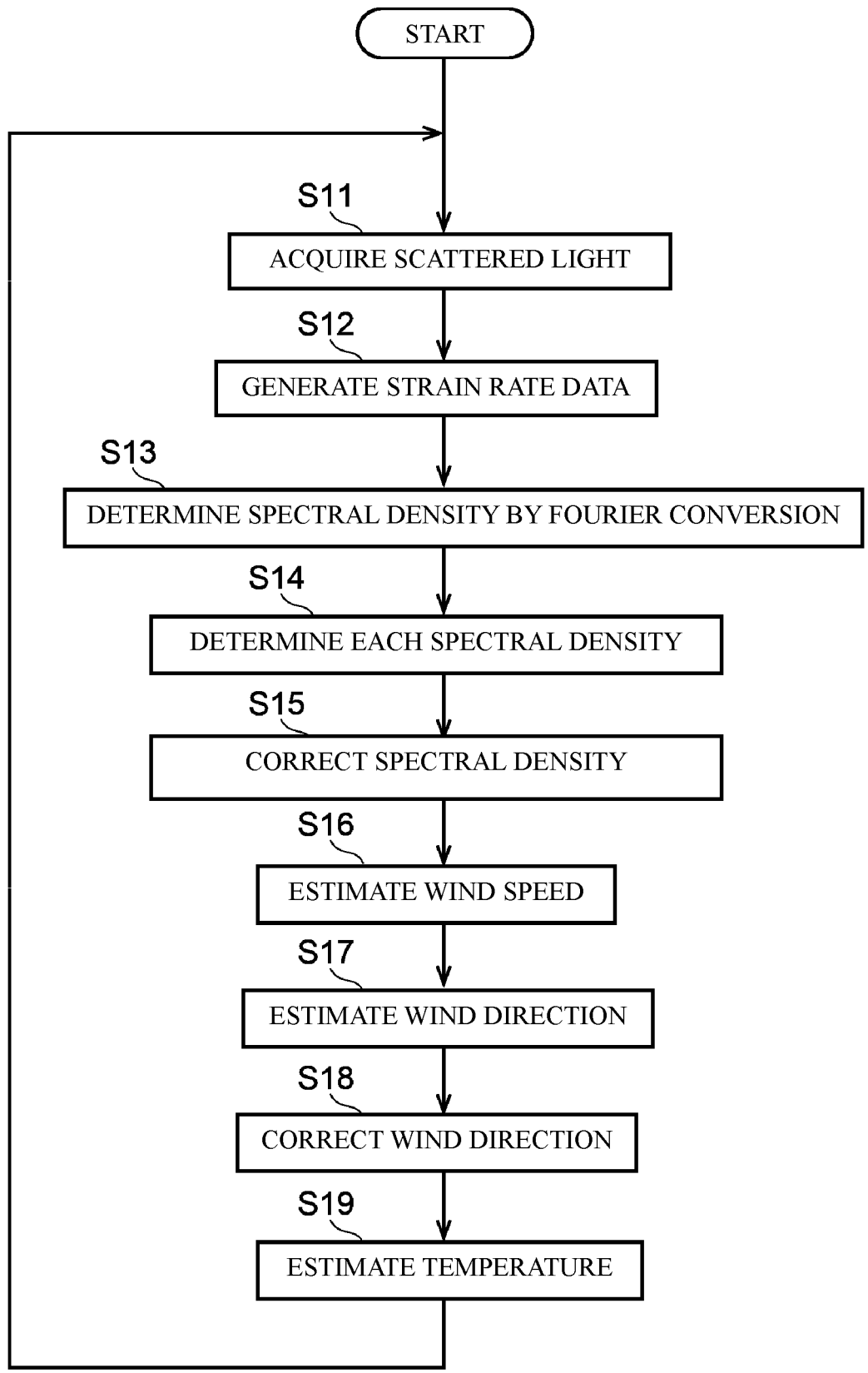
FIG. 13 is a flowchart of an estimation method according to s present embodiment.

Next, the estimation method according to the present embodiment will be described. FIG. 13 is a flowchart of the estimation method according to the present embodiment.

First, the acquirer 21 acquires coherent light, which is Rayleigh scattered light emitted from the optical fiber 30 (step S11).

Next, the generator 22 generates time-series strain rate data at each position of the optical fiber 30 based on the Rayleigh scattered light acquired by the acquirer 21 (step S12).

FIG. 14 is a schematic diagram illustrating an example of the strain rate data. As illustrated in FIG. 14, the strain rate data is information in which the elapsed time from the start of measurement, the position of the optical fiber 30, and the strain rate ($\mu\varepsilon$/s) are associated with each other.

Refer to FIG. 11 again. Next, the determiner 23 determines the spectral density at each frequency by performing a short-time Fourier transform on the strain rate data at an arbitrary window width (step S13). The arbitrary window width is the window width at the time when the wind direction and the wind speed are to be output.

Further, the determiner 23 specifies the first spectral density "X" and the second spectral density "Y" from the spectral densities (step S14).

Next, the corrector 26 corrects the first spectral density "X" according to the method described with reference to FIG. 11 (step S15).

Next, the wind speed estimator 24 estimates the wind speed based on the first spectral density "X" using the above equation (4) (step S16).

Subsequently, the wind direction estimator 25 estimates the wind direction based on the second spectral density "Y" using the above-mentioned equation (2) (step S17).

Next, the corrector 26 corrects the wind direction according to the method described with reference to FIG. 10 (step S18).

Subsequently, the temperature estimator 27 estimates the temperature of the transmission line 2 according to the method described with reference to FIG. 12 (step S19). After that, the process returns to step S11 after a certain period of time has elapsed. This completes the basic processing of the estimation method according to the present embodiment.

According to the above-described embodiment, the wind speed and the wind direction can be estimated based on the respective spectral densities "X" and "Y" by using the DAS as the estimation device 100. Therefore, it is not necessary to provide a large number of sensors for measuring the wind speed and the wind direction in the transmission line 2, and the wind speed and the wind direction of the wind hitting the transmission line 2 can be easily detected.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A computer-readable, non-transitory medium storing a program that causes a computer to execute a process, the process comprising:
   acquiring a backward Rayleigh scattered light from an optical fiber composite overhead ground wire that is provided along an electrical power transmission line;
   determining each of spectral densities of each of a plurality of frequencies of vibration of the optical fiber composite overhead ground wire, on a basis of the backward Rayleigh scattered light;
   estimating a wind speed of a wind hitting the electrical power transmission line, on a basis of a first spectral density of a first frequency band including a natural frequency of the optical fiber composite overhead ground wire among the spectral densities; and
   estimating a wind direction of the wind, on a basis of a second spectral density of a second frequency band which does not include the natural frequency of the optical fiber composite overhead ground wire among the spectral densities.

2. The medium as claimed in claim 1, wherein when vibration intensity of the natural frequency decreases as the wind speed increases, the first spectral density is corrected so that decrease of the vibration intensity is compensated for.

3. The medium as claimed in claim 1,
wherein a first angle "θ" between a first direction and the wind direction is estimated within 0≤θ≤90 degrees in the estimating the wind direction,
wherein a second angle "ϕ" is acquired between the first direction and the wind direction within 0≤ϕ≤360 degrees, and
wherein the first angle "θ" is corrected in accordance with the second angle "ϕ".

4. The medium as claimed in claim 3,
wherein the first angle "θ" is not corrected when 0 degree≤ϕ≤90 degrees,
wherein the first angle "θ" is corrected to "180 degrees−θ" when 90 degrees<ϕ≤180 degrees,
wherein the first angle "θ" is corrected to "180 degrees+θ" when 180 degrees<ϕ≤270 degrees, and
wherein the first angle "θ" is corrected to "360 degrees−θ" when 270 degrees<ϕ≤360 degrees.

5. The medium as claimed in claim 1, wherein a temperature of the electrical power transmission line is estimated on a basis of the wind direction which is estimated and the wind speed which is estimated.

6. An estimation device comprising:
a memory; and
a processor coupled to the memory and the processor configured to execute a process, the process comprising:
acquiring a backward Rayleigh scattered light from an optical fiber composite overhead ground wire that is provided along an electrical power transmission line;
determining each of spectral densities of each of a plurality of frequencies of vibration of the optical fiber composite overhead ground wire, on a basis of the backward Rayleigh scattered light;
estimating a wind speed of a wind hitting the electrical power transmission line, on a basis of a first spectral density of a first frequency band including a natural frequency of the optical fiber composite overhead ground wire among the spectral densities; and
estimating a wind direction of the wind, on a basis of a second spectral density of a second frequency band which does not include the natural frequency of the optical fiber composite overhead ground wire among the spectral densities.

7. The estimation device as claimed in claim 6, wherein when vibration intensity of the natural frequency decreases as the wind speed increases, the first spectral density is corrected so that decrease of the vibration intensity is compensated for.

8. The estimation device as claimed in claim 6,
wherein a first angle "θ" between a first direction and the wind direction is estimated within 0≤θ≤90 degrees in the estimating the wind direction,
wherein a second angle "ϕ" is acquired between the first direction and the wind direction within 0≤θ≤360 degrees, and
wherein the first angle "θ" is corrected in accordance with the second angle "ϕ".

9. The estimation device as claimed in claim 8,
wherein the first angle "θ" is not corrected when 0 degree<ϕ≤90 degrees,
wherein the first angle "θ" is corrected to "180 degrees−θ" when 90 degrees<ϕ≤180 degrees,
wherein the first angle "θ" is corrected to "180 degrees+θ" when 180 degrees<ϕ≤270 degrees, and
wherein the first angle "θ" is corrected to "360 degrees−θ" when 270 degrees<ϕ≤360 degrees.

10. The estimation device as claimed in claim 6, wherein a temperature of the electrical power transmission line is estimated on a basis of the wind direction which is estimated and the wind speed which is estimated.

11. An estimation method implemented by a computer, the control method comprising:
acquiring a backward Rayleigh scattered light from an optical fiber composite overhead ground wire that is provided along an electrical power transmission line;
determining each of spectral densities of each of a plurality of frequencies of vibration of the optical fiber composite overhead ground wire, on a basis of the backward Rayleigh scattered light;
estimating a wind speed of a wind hitting the electrical power transmission line, on a basis of a first spectral density of a first frequency band including a natural frequency of the optical fiber composite overhead ground wire among the spectral densities; and
estimating a wind direction of the wind, on a basis of a second spectral density of a second frequency band which does not include the natural frequency of the optical fiber composite overhead ground wire among the spectral densities.

12. The method as claimed in claim 11, wherein when vibration intensity of the natural frequency decreases as the wind speed increases, the first spectral density is corrected so that decrease of the vibration intensity is compensated for.

13. The method as claimed in claim 11,
wherein a first angle "θ" between a first direction and the wind direction is estimated within 0≤θ≤90 degrees in the estimating the wind direction,
wherein a second angle "ϕ" is acquired between the first direction and the wind direction within 0≤ϕ≤360 degrees, and
wherein the first angle "θ" is corrected in accordance with the second angle "ϕ".

14. The method as claimed in claim 13,
wherein the first angle "θ" is not corrected when 0 degree≤ϕ≤90 degrees,
wherein the first angle "θ" is corrected to "180 degrees−θ" when 90 degrees<ϕ≤180 degrees,
wherein the first angle "θ" is corrected to "180 degrees+θ" when 180 degrees<ϕ≤270 degrees, and
wherein the first angle "θ" is corrected to "360 degrees−θ" when 270 degrees<ϕ≤360 degrees.

15. The method as claimed in claim 11, wherein a temperature of the electrical power transmission line is estimated on a basis of the wind direction which is estimated and the wind speed which is estimated.

* * * * *